(12) United States Patent
Mizunuma et al.

(10) Patent No.: US 9,689,711 B2
(45) Date of Patent: Jun. 27, 2017

(54) POSITION DETECTING DEVICE

(71) Applicant: DENSO CORPORATION, Kariya, Aichi-pref. (JP)

(72) Inventors: Takehito Mizunuma, Chiryu (JP); Tomoyuki Takiguchi, Okazaki (JP); Takamitsu Kubota, Chiryu (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 14/573,284

(22) Filed: Dec. 17, 2014

(65) Prior Publication Data

US 2015/0177025 A1    Jun. 25, 2015

(30) Foreign Application Priority Data

Dec. 24, 2013   (JP) .................... 2013-265320

(51) Int. Cl.
  *G01D 5/14*   (2006.01)
  *G01D 11/24*  (2006.01)
(52) U.S. Cl.
  CPC ........... *G01D 5/14* (2013.01); *G01D 5/145* (2013.01); *G01D 11/245* (2013.01)
(58) Field of Classification Search
  CPC ......... G01D 5/14; G01D 11/245; G01D 5/145
  See application file for complete search history.

(56) References Cited

U.S. PATENT DOCUMENTS

2011/0094474 A1    4/2011  Ikeda et al.
2012/0268111 A1*  10/2012  Hiramoto ............ G01D 11/245
                                                      324/207.25
2014/0077794 A1    3/2014  Takiguchi et al.

FOREIGN PATENT DOCUMENTS

JP          2004233103 A  *  8/2004

OTHER PUBLICATIONS

JP 2004233103 A, English translation.*
Office Action (2 pages) dated Feb. 16, 2016, issued in corresponding Japanese Application No. 2013-265320 and English translation (2 pages).

* cited by examiner

*Primary Examiner* — Patrick Assouad
*Assistant Examiner* — Haidong Zhang
(74) *Attorney, Agent, or Firm* — Nixon & Vanderhye P.C.

(57) ABSTRACT

A position detecting device includes a first sensor portion having a first mold resin object molded for a first magnetic sensor and a first wiring and a second sensor portion having a second mold resin object molded for a second magnetic sensor and a second wiring. The first sensor portion and the second sensor portion have a protrusion part defined between the first magnetic sensor of the first sensor portion and the second magnetic sensor of the second sensor portion to provide a clearance between the first magnetic sensor and the second magnetic sensor.

15 Claims, 8 Drawing Sheets

POSITION DETECTING DEVICE

CROSS REFERENCE TO RELATED APPLICATION

This application is based on Japanese Patent Application No. 2013-265320 filed on Dec. 24, 2013, the disclosure of which is incorporated herein by reference in its entirety.

TECHNICAL FIELD

The present disclosure relates to a position detecting device.

BACKGROUND

A position detecting device detects a position of a component in an apparatus. JP 2012-233875A (corresponding to US 2012/0268111 A1) describes a position detecting device that is applied to a rotation angle detecting device for computing an opening degree of a throttle valve in an electronic control throttle apparatus for a vehicle. The rotation angle detecting device is a noncontact type device that detects a rotation angle of a shaft based on a change in a magnetic field, and is fixed to the shaft. The rotation angle detecting device includes a permanent magnet rotating on the rotor side, and a magnetic sensor fixed on the stator side in the non-contact state.

A position detecting device has one or two magnetic sensors according to the exclusive use. For example, in JP 2012-233875A, the position detecting device has two magnetic sensors that are molded together with resin material to an attachment object such as housing or cover. However, this detecting device cannot be used as a position detecting device which has one magnetic sensor. Similarly, in a position detecting device which has only one magnetic sensor, the one magnetic sensor is molded with resin material to an attachment object, and the detecting device cannot be used as a position detecting device which has two magnetic sensors.

SUMMARY

It is an object of the present disclosure to provide a position detecting device that includes two magnetic sensors as common parts, in which the output characteristics of the magnetic sensors are restricted from having variations and fluctuations.

According to an aspect of the present application, a position detecting device includes a first sensor portion and a second sensor portion. The first sensor portion includes a first magnetic sensor, a first wiring extending from the first magnetic sensor, and a first mold resin object molded for the first magnetic sensor and the first wiring. The second sensor portion includes a second magnetic sensor, a second wiring extending from the second magnetic sensor, and a second mold resin object molded for the second magnetic sensor and the second wiring. A terminal is connected to a part of the first wiring projected from the first mold resin object and is connected to a part of the second wiring projected from the second mold resin object. A third mold resin object is molded for the first sensor portion, the second sensor portion, and the terminal to cover the first wiring, the second wiring, and the terminal. The third mold resin object fixes the first sensor portion and the second sensor portion to oppose to each other. The first sensor portion and the second sensor portion have a protrusion part to provide a clearance between the first magnetic sensor and the second magnetic sensor on surfaces of the first sensor portion and the second sensor portion opposing to each other.

Accordingly, the position detecting device has the two sensor portions independent from each other as basic composition. The two sensor portions are constructed by common parts having an identical configuration as a first sensor portion and a second sensor portion. By attaining the commonality of parts, the position detecting device which has two magnetic sensors and the position detecting device having one magnetic sensor are produced by using only one magnetic sensor or two magnetic sensors. Thus, costs in design, manufacture, and management can be reduced, and the position detecting device can be produced at a low cost.

The first sensor portion and the second sensor portion have the protrusion part that separates the first magnetic sensor and the second magnetic sensor from each other on the surfaces opposing to each other. The remaining stress caused by the mold fabrication of the third mold resin object does not influence the first magnetic sensor and the second magnetic sensor, so the output characteristic of the first magnetic sensor and the second magnetic sensor can be prevented from changing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
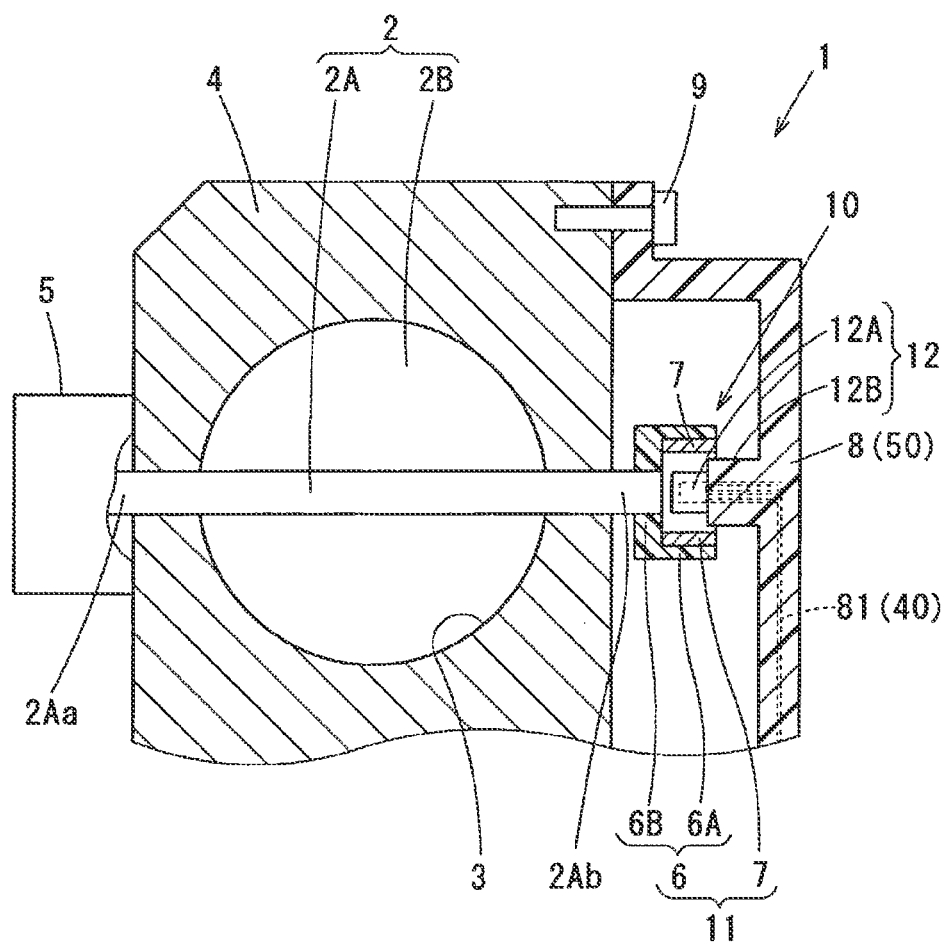
FIG. 1 is a schematic sectional view illustrating an electronic control throttle apparatus including a rotation angle detecting device according to an embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A position detecting device according to an embodiment is applied to a rotation angle detecting device 10 suitable for an electronic control throttle apparatus 1 mounted in a vehicle.

Figure 2:
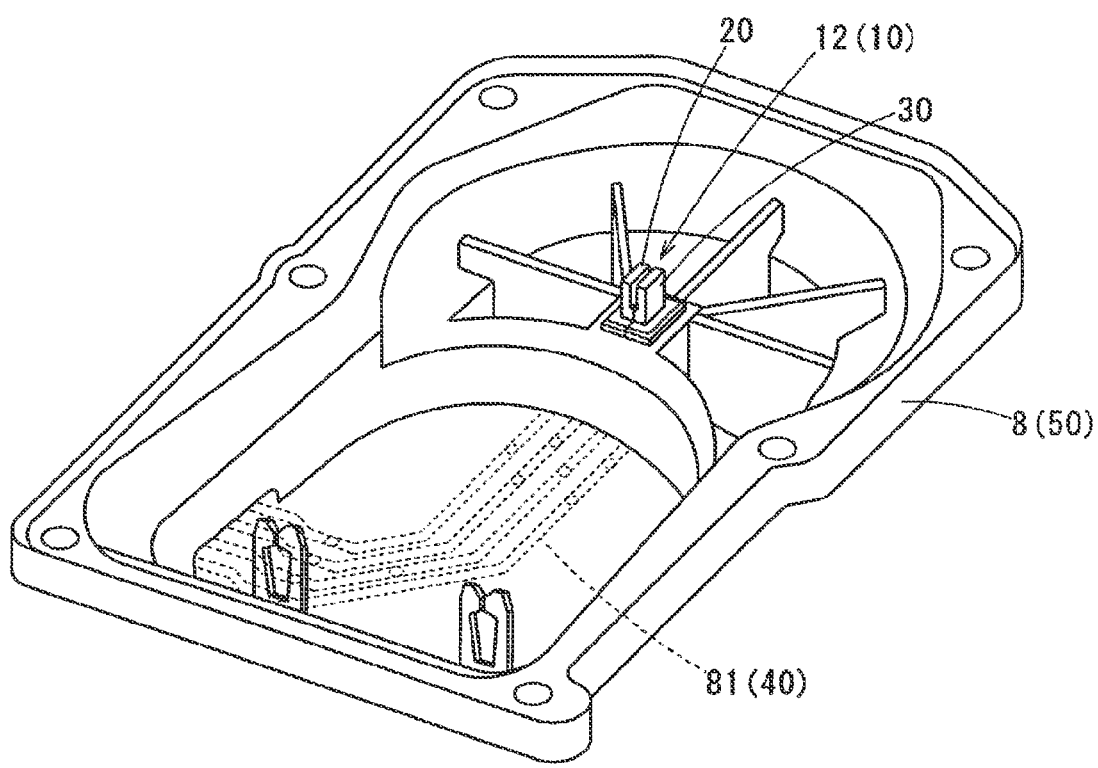
FIG. 2 is a perspective view of a cover of the rotation angle detecting device of the embodiment.

The electronic control throttle apparatus 1 is explained based on FIG. 1 and FIG. 2.

The electronic control throttle apparatus 1 electronically controls an opening degree of a throttle valve 2 according to the operational status of an engine (not shown) of the vehicle. The rotation angle detecting device 10 detects and calculates the opening degree of the throttle valve 2 as a position detecting device. The rotation angle detecting device 10 is a noncontact type device having a rotor 11 and a stator 12, and detects the rotation angle of a shaft 2A of the throttle valve 2.

The throttle valve 2 includes the shaft 2A and a valve object 2B having an approximately disk shape, and the valve object 2B is disposed in an intake passage 3. The shaft 2A is integrally formed with the valve object 2B as one-piece component such that the center section of the valve object 2B is connected to the shaft 2A in the thickness direction. The shaft 2A has a first end portion 2Aa and a second end portion 2Ab exposed from the valve object 2B. The first end portion 2Aa and a second end portion 2Ab are rotatably supported by a throttle body 4 which defines the intake passage 3. Therefore, the valve object 2B can rotate in the intake passage 3 together with the shaft 2A, and the intake passage 3 is opened or closed by the throttle valve 2.

The throttle body 4 connects the engine to an air cleaner (not shown) from which outside air is drawn. FIG. 1 is a view seen in the extending direction of the intake passage 3, and an intake port of the engine is connected to a discharge port of the air cleaner by the intake passage 3. The throttle valve 2 is arranged relative to the intake passage 3 such that the shaft 2A and the valve object 2B are approximately perpendicular to the flow direction of intake air. The first end portion 2Aa and the second end portion 2Ab of the shaft 2A are projected from the throttle body 4.

A motor 5 is attached to the first end portion 2Aa of the shaft 2A. The motor 5 rotates the shaft 2A based on a control signal output from an electronic control unit (ECU, not shown). The ECU controls the opening degree of the throttle valve 2 by controlling the rotation of the motor 5 so as to control the amount of intake air supplied to the engine. The motor 5 and the ECU have well-known structures.

A holder 6 is attached to the second end portion 2Ab of the shaft 2A. The holder 6 has a pipe part 6A and a bottom 6B which closes one end of the pipe part 6A, such that the holder 6 has a based cylindrical shape with the U-shaped cross-section as a whole. The center of the bottom 6B of the holder 6 is fixed to the second end portion 2Ab of the shaft 2A. A magnet (permanent magnet) 7 is disposed inside the pipe part 6A of the holder 6. The magnet 7 may be, for example, a bond magnet in which the N pole and the S pole are alternately arranged in the circumferential direction of the pipe part 6A. When the shaft 2A is rotated, the magnetic field is varied inside of the pipe part 6A. In this way, the rotor 11 of the rotation angle detecting device 10 is provided by the holder 6 and the magnet 7.

A cover 8 made of resin material protects the rotation angle detecting device 10, and is fixed to the throttle body 4 by a fastening member such as bolt 9. A terminal 81 extends inside the cover 8, and has a predetermined circuit pattern for connecting the rotation angle detecting device 10 to the ECU which is an external apparatus. A stator 12 of the rotation angle detecting device 10 is attached to the cover 8, and is projected inward from the cover 8.

The rotation angle detecting device 10 includes the rotor 11 and the stator 12 which are in a non-contact state, while the rotor 11 is attached to the shaft 2A of the throttle valve 2 and the stator 12 is projected inward from the cover 8. Specifically, a sensor assembly 12A of the stator 12 is loosely arranged inside the rotor 11, e.g., the pipe part 6A of the holder 6, such that the sensor assembly 12A is placed inside of a magnetic field. When the shaft 2A of the throttle valve 2 rotates, the magnetic field is varied in the pipe part 6A, thereby taking out a signal (voltage) according to the opening degree of the throttle valve 2 from the sensor assembly 12A. This signal is transmitted to the ECU through the terminal 81, and is used as a control signal.

The stator 12 of the rotation angle detecting device 10 is explained with reference to FIG. 3 and FIG. 4.

The stator 12 has the sensor assembly 12A and an attachment portion 12B holding the sensor assembly 12A. The attachment portion 12B is molded with resin material so as to be integrally formed with the cover 8.

The sensor assembly 12A includes a first sensor portion 20, a second sensor portion 30 and a terminal 40 electrically connected to a wiring 22 extended from the first sensor portion 20 and a wiring 32 extended from the second sensor portion 30.

The attachment portion 12B holding the sensor assembly 12A has a third mold resin object 50, and is substantially constructed by the third mold resin objects 50. The third mold resin object 50 is molded for the first sensor portion 20, the second sensor portion 30, and the terminal 40 of the sensor assembly 12A, such that the first sensor portion 20 and the second sensor portion 30 are fixed to oppose to each other. Further, the wiring 22 exposed from the first sensor portion 20, the wiring 32 exposed from the second sensor portion 30 and the terminal 40 are surrounded and protected by the third mold resin object 50. In this embodiment, the terminal 40 forms a part of a terminal 81 arranged totally inside the cover 8, and the third mold resin object 50 forms a part of the cover 8.

The first sensor portion 20 and the second sensor portion 30 have almost completely the same structure including appearance (outlook). In other words, the first sensor portion 20 and the second sensor portion 30 are common parts with each other.

The common structure of the first sensor portion 20 and the second sensor portion 30 is explained.

The first sensor portion 20 has a first magnetic sensor 21, the wiring (first wiring) 22 extending from the first magnetic sensor 21, and a first mold resin object 23 molded for the first wiring 22 the first magnetic sensor 21. Similarly, the second sensor portion 30 has a second magnetic sensor 31, the wiring (second wiring) 32 extending from the second magnetic sensor 31, and a second mold resin object 33 molded for the second magnetic sensor 31 and the second wiring 32. A tip end of the wiring 22, 32 forms a wiring portion extending from the mold resin object 23, 33 for wire-connection in the exposed state, and is electrically connected to the terminal 40 (terminal 81), for example, by welding.

Each of the magnetic sensors 21, 31 has a magnetic detection element 21a, 31a, a sealing object 21b, 31b, and a lead 21c, 31c. The magnetic detection element 21a, 31a is a magnetic sensor element such as Hall IC or MR element, and may be a general-purpose element integrally having a signal amplification circuit, if needed. The sealing object 21b, 31b is made of plastic (resin) material, and is arranged to cover whole of the magnetic detection element 21a, 31a so as to protect the magnetic detection element 21b, 31b from external shock, heat, or humidity. The lead 21c, 31c is connected to the wiring 22, 32 for wire-connection, for example, by welding.

A chip capacitor 13 is installed in each of the first wiring 22 and the second wiring 32, for example, by soldering. The chip capacitor 13 is also arranged totally inside the mold resin object 23, 33 together with the wiring 22, 32 so as to be protected.

The external shape and appearance of the first sensor portion 20 and the second sensor portion 30 are explained.

Figure 3:
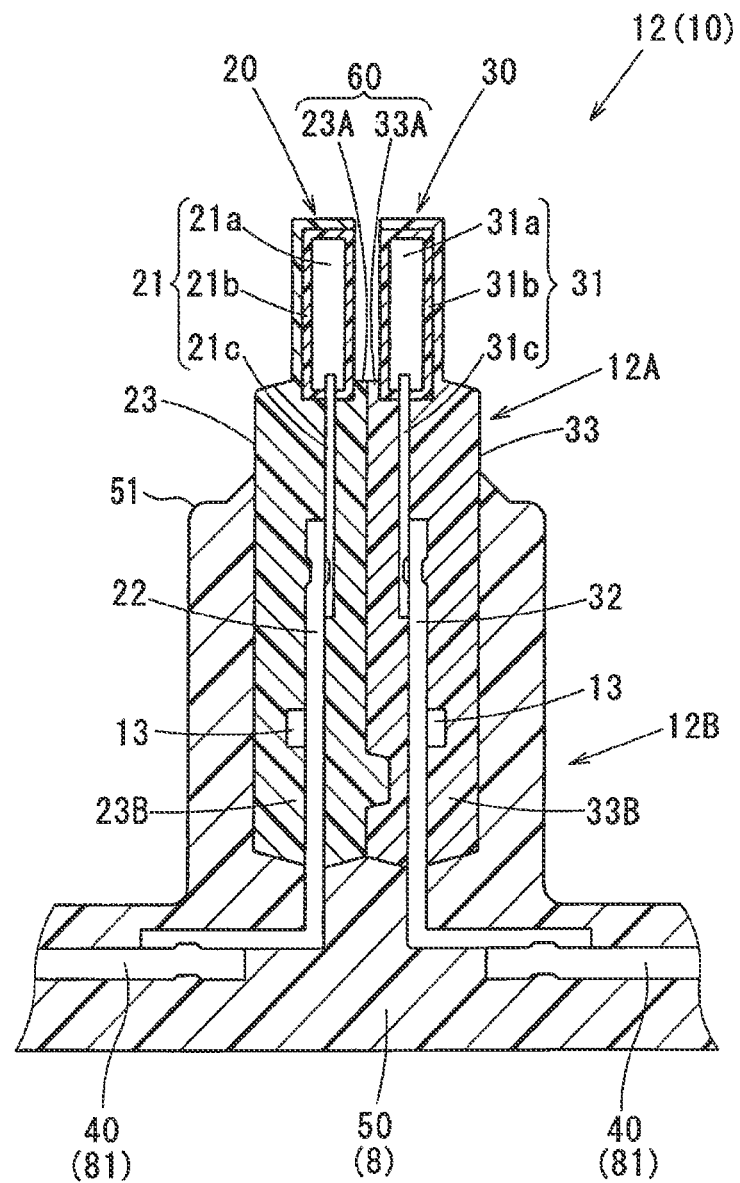
FIG. 3 is a cross-sectional view illustrating a stator of the rotation angle detecting device of the embodiment.
Figure 4:
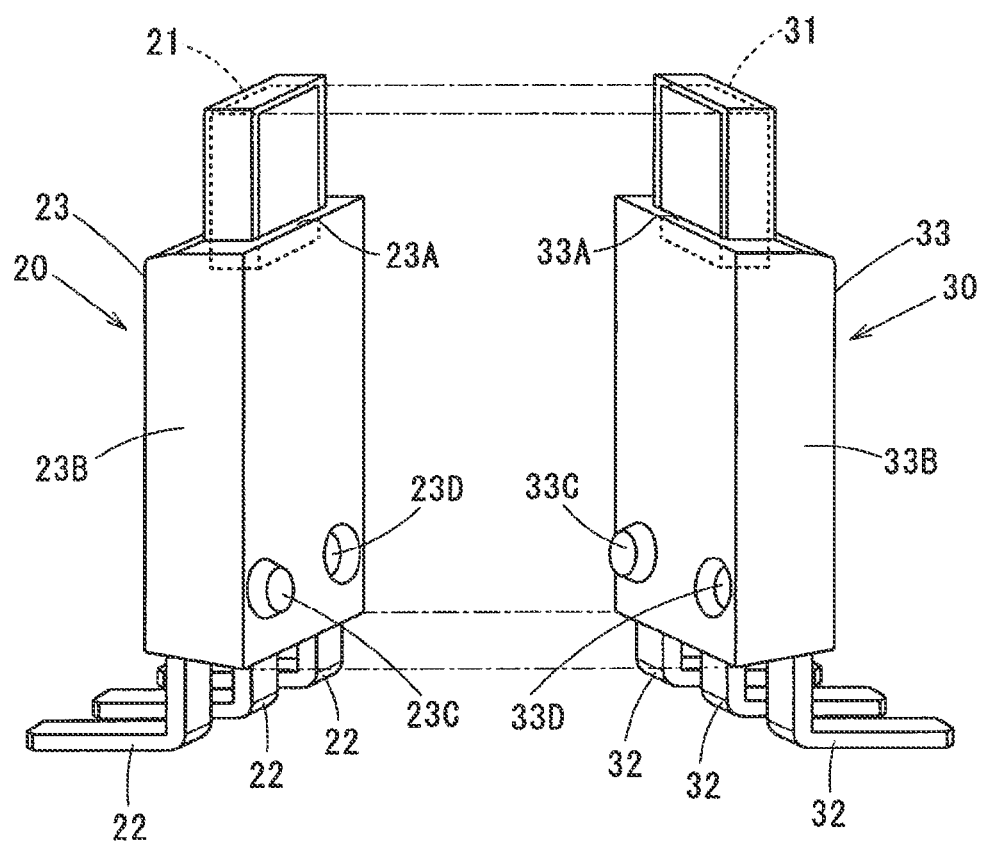
FIG. 4 is a perspective view illustrating an assembling relationship between two sensor portions in the stator of the rotation angle detecting device of the embodiment.

As shown in FIG. 3 and FIG. 4, the first sensor portion 20 and the second sensor portion 30 are fixed to face and overlap with each other. The appearance of the first sensor portion 20 and the second sensor portion 30 is mainly constructed by the first mold resin object 23 and the second mold resin object 33 respectively. The first mold resin object 23 and the second mold resin object 33 have, as a whole, an approximately rectangle body with a tip end portion that is partially projected from the rectangle body. The first mold resin object 23 and the second mold resin object 33 respectively have a first stepped portion 23A and a second stepped portion 33A that correspond to a protrusion part 60. The stepped portion represents a portion that forms a step height (elevation change) relative to the other surface.

The first stepped portion 23A is projected from a main rectangle body 23B of the first mold resin object 23, and the second stepped portion 33A is projected from a main rectangle body 33B of the second mold resin object 33. The tip end portion of the stepped portion 23A, 33A projected from the rectangle main body 23B, 33B holds the magnetic sensor 21, 31. The first sensor portion 20 and the second sensor portion 30 have surfaces oppose to each other. The first stepped portion 23A is defined on the surface of the first sensor portion 20, and the second stepped portion 33A is defined on the surface of the second sensor portion 30. Surfaces of the magnetic sensors 21, 31 opposing to each other are exposed outside.

That is, the first stepped portion 23A covers only the lower end part of the surface of the first magnetic sensor 21, and the second stepped portion 33A covers only the lower end part of the surface of the second magnetic sensor 31. The lower end part is an end part of the magnetic sensor 21, 31 adjacent to the lead 21c, 31c. The first stepped portion 23A is in contact with at least an end part of the sealing object 21b adjacent to the lead 21c, and the second stepped portion 33A is in contact with at least an end part of the sealing object 31b adjacent to the lead 31c.

Moreover, the first stepped portion 23A and the second stepped portion 33A have surfaces opposing to each other, and the surfaces are the same plane as the surfaces of the main rectangle bodies 23B and 33B opposing to each other. The first mold resin object 23 and the second mold resin object 33 are in contact with each other through the plane, thereby causing the first sensor portion 20 and the second sensor portion 30 are in contact with each other.

The protrusion part 60 is provided to define a clearance between the first magnetic sensor 21 and the second magnetic sensor 31 so that the first magnetic sensor 21 and the second magnetic sensor 31 are not in contact with each other. That is, the lower end parts of the magnetic sensors 21 and 31 opposing to each other are respectively covered by the first stepped portion 23A and the second stepped portion 33A which are in contact with each other, thereby causing the first magnetic sensor 21 and the second magnetic sensor 31 are made to separate from each other.

As shown in FIG. 4, the first mold resin object 23 has the surface to be in contact with the second mold resin object 33, and the surface of the first mold resin object 23 has a first projection part 23C and a first recess part 23D. The second mold resin object 33 has the surface to be in contact with the first mold resin object 23, and the surface of the second mold resin object 33 has a second projection part 33C and a second recess part 33D.

Specifically, the first projection part 23C and the first recess portion 23D are symmetrically formed on the surface of the main rectangle body 23B of the first mold resin object 23 in contact with the main rectangle body 33B of the second mold resin object 33. Similarly, the second projection part 33C and the second recess portion 33D are symmetrically formed on the surface of the main rectangle body 33B of the second mold resin object 33 in contact with the main rectangle body 23B of the first mold resin object 23.

The first projection part 23C and the second projection part 33C present the projection taper shape in which the outside diameter becomes smaller toward the tip end, and the first recess portion 23D and the second recess portion 33D present the recess taper shape in which then inside diameter becomes smaller toward the bottom end.

Therefore, when the first sensor portion 20 and the second sensor portion 30 are made in contact with each other in the opposed state, the first projection part 23C of the first sensor portion 20 and the second recess portion 33D of the second sensor portion 30 are fitted with each other, and the first recess portion 23D of the first sensor portion 20 and the second projection part 33C of the second sensor portion 30 are fitted with each other. Thereby, the first sensor portion 20 and the second sensor portion 30 are restricted from having position deviation from each other, and can be combined as one sensor unit.

Figure 5:
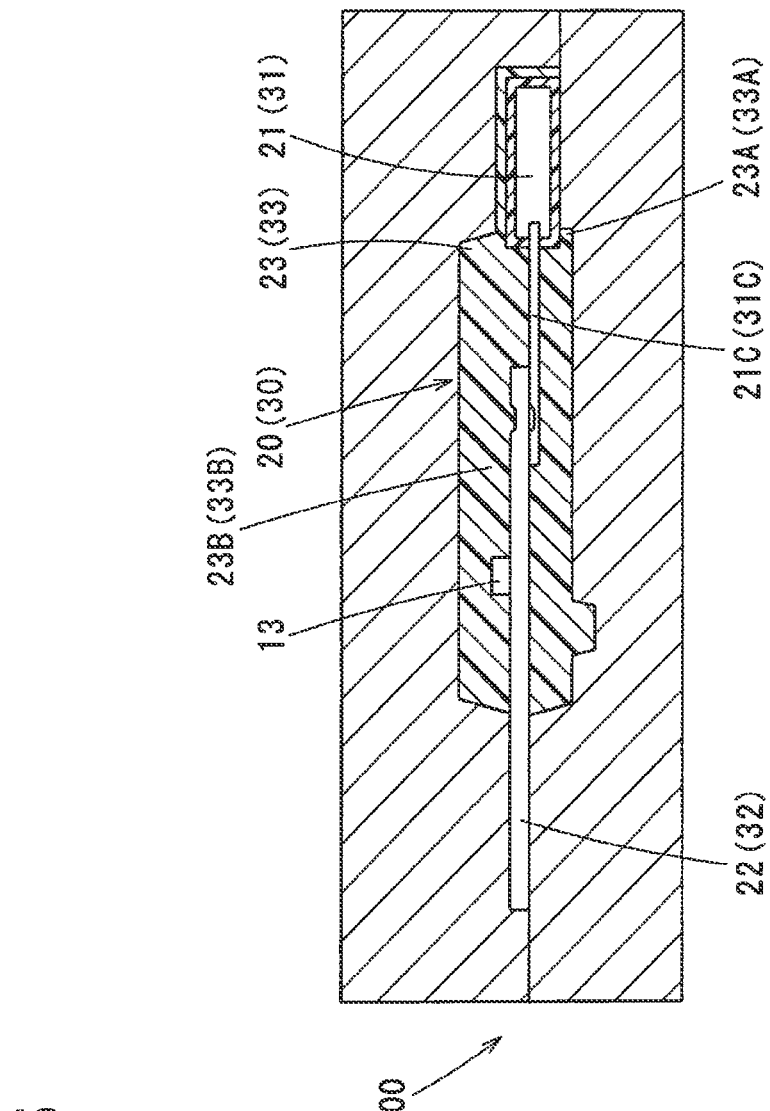
FIG. 5 is a sectional view illustrating a process of producing a sensor portion of the stator of the rotation angle detecting device of the embodiment.

The production method of the rotation angle detecting device 10, e.g., the production method of the stator 12, is explained referring to FIG. 5.

First, the sensor portions 20 and 30 are produced to have substantially the same configuration including the appearance. For this reason, the production method of the first sensor portion 20 is described, and the explanation of the production method of the second sensor portion 30 is omitted.

In producing the first sensor portion 20, the first wiring 22 having the band shape that is made of an electric conduction board (for example, copper plate) is connected to the lead 21c of the first magnetic sensor 21 by welding. The chip capacitor 13 is soldered to the first wiring 22 if needed. Then, primary fabrication of the first mold resin object 23 is carried out.

In this primary fabrication, as shown in FIG. 5, a composition object which consists of the first magnetic sensor 21, the first wiring 22, and the chip capacitor 13 is arranged in a mold 100 for the sensor portion, in an injection molding machine. A thermosetting resin such as epoxy resin is injected into the mold 100 and hardened, and the primary fabrication produce is taken out from the mold 100, such that the first sensor portion 20 is produced in which the composition object is covered with the first mold resin object 23 having the first stepped portion 23A. The second sensor portion 30 is similarly produced. Therefore, the sensor portions 20 and 30 can be mass-produced as common parts.

After bending the first wiring 22 of the first sensor portion 20 and the second wiring 32 of the second sensor portion 30 right-angled at a predetermined position, the first sensor portion 20 and the second sensor portion 30 are set as one unit by fitting and overlapping the projection part and the recess portion while the first sensor portion 20 and the second sensor portion 30 are set to oppose to each other.

Then, after the wiring 22, 32 is connected to the terminal 40 (a predetermined part of the terminal 81) by welding, whole of the unit including the first sensor portion 20, the second sensor portion 30, and the terminal 81 is arranged in a mold for molding the cover 8 in the injection molding machine. An injection mold is performed with resin as a secondary fabrication relative to the whole unit including the terminal 81, and the secondary fabrication product is taken out from the mold.

The resin used for this secondary fabrication may be thermoplastic resin such as poly-butylene-terephthalate (PBT) resin called as an engineering plastic. In this way, the stator 12 equipped with the third mold resin object 50 (a part of the cover 8) is produced. As shown in FIG. 3, an end surface 51 of the third mold resin object 50 adjacent to the first magnetic sensor 21 is located between the protrusion part 60 and the terminal 40.

According to the rotation angle detecting device (position detecting device) 10 of the embodiment, the first sensor portion 20 and the second sensor portion 30 are common parts having the identical configuration including the appearance. Thus, a position detecting device having one magnetic sensor and a position detecting device having two magnetic sensors are properly produced and used by using one piece or two pieces of the sensor portion having the identical configuration so as to attain commonality of parts. Costs in design, manufacture, and management can be reduced, and the position detecting device can be produced at low cost.

According to the embodiment, two components, i.e., the first sensor portion 20 and the second sensor portion 30, can be accurately made into one unit. When the first projection part 23C and the second recess portion 33D are fitted with each other and when the second projection part 33C and the first recess portion 23D are fitted with each other, the first sensor portion 20 and the second sensor portion 30 can be positioned with accuracy. Therefore, the accuracy in the positions of the magnetic sensors 21 and 31 of the stator 12 can be raised.

According to the embodiment, the positioning is performed by the projection parts and the recess portions. The commonality of parts is not restricted by the positioning performed by the projection parts and the recess portions. The projection part and the recess portion are produced by utilizing the primary fabrication process, and no special processing for the projection part and the recess portion is required.

According to the embodiment, the protrusion part 60 separates the first magnetic sensor 21 and the second magnetic sensor 31 from each other while the first sensor portion 20 and the second sensor portion 30 are made in the substantial contact state. Therefore, the output characteristics of the first magnetic sensor 21 and the second magnetic sensor 31 are restricted from having variations and fluctuations.

According to the embodiment, the separation of the magnetic sensors achieved by the protrusion part 60 is realized by making the shoulder portions 23A and 33A in contact with each other which are respectively formed in the mold resin objects 23 and 33. The commonality of parts is not restricted by the stepped portions. The stepped portions are produced by utilizing the primary fabrication process, and no special process for the stepped portions is required.

Figure 6:
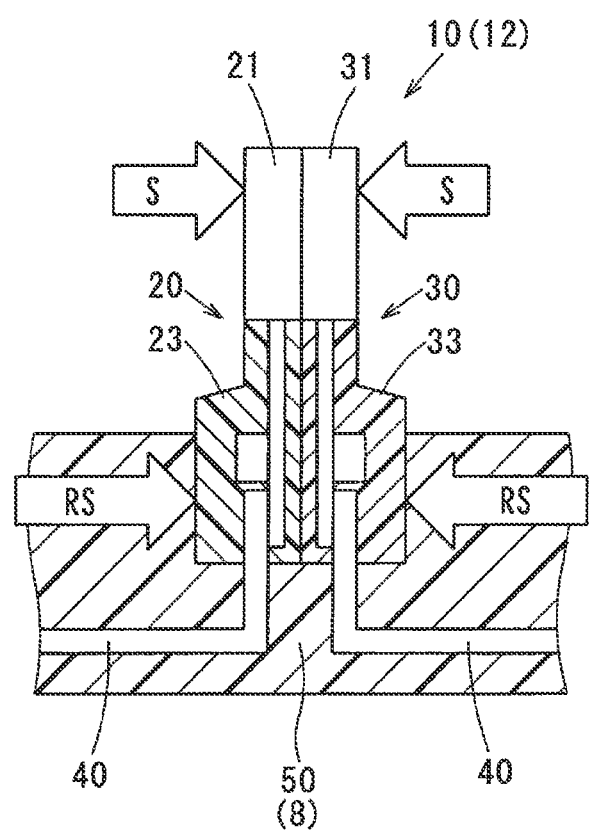
FIG. 6 is a cross-sectional view illustrating a stator of a rotation angle detecting device of a comparative example.

The advantage of the present disclosure that the output characteristics of the first magnetic sensor 21 and the second magnetic sensor 31 are restricted from having variations is more specifically described in contrast to a comparative example shown in FIG. 6.

A position detecting device of the comparative example is equipped with common parts so as to respond to the difference in the number of magnetic sensors.

In the comparative example, the position detecting device having two magnetic sensors includes the first sensor portion and the second sensor portion which are overlapped with each other in the contact state as common parts. Whole of the position detecting device is molded with resin to fix. However, the output characteristic of the magnetic sensor is varied in the comparative example, because a stress S is applied to the parts which are in contact with each other by the remaining stress RS generated in the resin mold object (produced by the secondary fabrication) for fixing the two common parts (i.e., the first sensor portion and the second sensor portion), although the magnetic sensors are enough protected in the primary fabrication.

Specifically, as shown in FIG. 6, when the resin mold object is produced by the secondary fabrication for two common parts (the first sensor portion 20 and the second sensor portion 30) to fix in the contact state, the remaining stress RS is generated in the third mold resin object 50 due to the solidification of resin when the temperature of resin is lowered. The stress S is caused between the two magnetic sensors 21 and 31 which are in contact with each other by the remaining stress RS. As a result, variation and fluctuation is generated in the output characteristics of the magnetic sensors 21 and 31. In case where the magnetic detection element is made of Hall IC, if stress is added from the exterior, the output characteristic is easily changed according to the piezo-effect.

In contrast, according to the embodiment, while the first sensor portion 20 and the second sensor portion 30 are made in contact with each other, the protrusion part 60 defined on the surfaces of the first sensor portion 20 and the second sensor portion 30 opposing to each other produces a space between the first magnetic sensor 21 and the second magnetic sensor 31. Therefore, even if a remaining stress occurs on the third mold resin object 50 by the secondary fabrication, the remaining stress does not influence the first magnetic sensor 21 and the second magnetic sensor 31. Accordingly, changes in the output characteristic of the first magnetic sensor 21 and the second magnetic sensor 31 are restricted.

Since the positions of the first magnetic sensor 21 and the second magnetic sensor 31 influence the detection accuracy, it is desirable to make both the sensors to locate as close as possible to the center of a magnetic circuit. For this reason, the thickness of the protrusion part 60 is set to have a predetermined value effectively reducing the distance between the sensors as minimum. In case where the Hall IC is used as a magnetic detection element, the distance between the sensors is settled uniquely by the thickness of the protrusion part 60. In case where the position of the Hall IC is distanced from the center of a magnetic circuit, if the linearity which is one of sensor characteristics is affected, a well-known correcting portion for correcting the output characteristics with multi-point compensation function may be used for achieving the desired linearity.

The first sensor portion 20 and the second sensor portion 30 have the identical configuration including the appearance. Therefore, due to the commonality of parts, utilizing one or two sensor portions having the identical configuration, the position detecting device which has one magnetic sensor and the position detecting device which has two magnetic sensors can be properly used. Accordingly, costs in design, manufacture, and management can be reduced, and the position detecting device can be produced at low cost. The first sensor portion 20 and the second sensor portion 30 respectively have the first shoulder portion 23A and the second shoulder portion 33A on the surfaces of the first mold resin object 23 and the second mold resin object 33 opposing to each other. The protrusion part 60 is defined by the first shoulder potion 23A and the second shoulder portion 33A in contact with each other.

Accordingly, the magnetic sensors are spaced from each other by the protrusion part 60 provided by the first stepped portion 23A and the second stepped portion 33A in contact with each other, which are respectively formed in the mold resin objects 23 and 33 by utilizing the primary fabrication process without a sacrifice in the commonality of parts and the appearance. Thus, no special process is required for producing the first stepped portion 23A and the second stepped portion 33A.

The first sensor portion 20 has the first projection part 23C and a first recess portion 23D on the surface of the first sensor portion 20 in contact with the second sensor portion 30. The second sensor portion 30 has the second projection part 33C and the second recess portion 33D on the surface of the second sensor portion 30 in contact with the first sensor portion 20. The first sensor portion 20 and the second sensor portion 30 are positioned by the first projection part 23C and the second recess portion 33D fitted with each other and the second projection part 33C and the first recess portion 23D fitted with each other.

Accordingly, two components, i.e., the first sensor portion 20 and the second sensor portion 30, are accurately made into one unit. Therefore, the accuracy can be raised in the positions of the magnetic sensors 21 and 31 of the stator 12.

Moreover, the positioning can be performed by the fitting between the projection part and the recess portion. The commonality of parts is not barred by the addition of the projection part and the recess portion. The projection part and the recess portion can be formed in the primary fabrication process, and no special process is required for producing the projection part and the recess portion.

Modifications of the embodiment are described.

In the embodiment, the protrusion part 60 is defined by the stepped portions 23A and 33A projected over whole the surfaces of the sensor portions 20 and 30 opposing to each other. Alternatively, the stepped portions 23A and 33A may be omitted substantially, and the protrusion part 60 may be defined by the main bodies 23B and 33B. That is, the stepped portions 23A and 33A are formed partially on the surfaces of the main bodies 23B and 33B opposing to each other, such that the first and second magnetic sensors 21 and 31 are separated from each other by the stepped portions 23A and 33A in contact with each other.

Moreover, the surfaces of the stepped portions 23A and 33A opposing to each other are not limited to a plane through which whole the surfaces are in contact with each other. The surfaces of the main bodies 23B and 33B opposing to each other are not limited to a plane through which whole the surfaces are in contact with each other. The protrusion part 60 may be defined by a recess and projection (non-plain) surface through which the surfaces are in partial contact with each other.

In case where the protrusion part 60 is defined by the recess and projection surface in the area surrounded with the third mold resin object 50, at the time of secondary fabrication, the third mold resin object 50 is positively made to flow into gap between the surfaces. Thus, the strength of attaching the sensor portions 20 and 30 with each other can be increased in the opposed arrangement.

While the sensor portions 20 and 30 are spaced from each other by the protrusion part 60 with a desired distance, the first mold resin object 23 may cover the surface of the first magnetic sensor 21 opposing the second magnetic sensor 31, and the second mold resin object 33 may cover the surface of the second magnetic sensor 31 opposing the first magnetic sensor 21.

In the embodiment, the projection parts 23C and 33C and the recess portions 23D and 33D for positioning have the same round shape. Alternatively, various combination of shapes which does not spoil the commonality of parts is employable. For example, it is also possible to make the shape as triangle or rectangle as a combination of those variants.

The lead 21c, 31c of the magnetic sensor 21, 31 may be used as the wiring 22, 32, depending on the sensors in the sensor portions 20 and 30.

In the embodiment, the third mold resin object 50 is configured as a part of the cover 8. The terminal 81 disposed inside the cover 8 and the terminal 40 disposed inside the third mold resin object 50 may be produced separately from each other. The secondary fabrication product including the terminal 40 may be individually produced as another object. Thereby, whole of the stator 12 using the two sensor portions can be made common parts so as to respond to the cover 8 having a variety of shapes.

In the embodiment, the first stepped portion 23A is located in an area that is able to overlap with a projection area defined by projecting the first magnetic sensor 21 to the second magnetic sensor 31.

Figure 7:
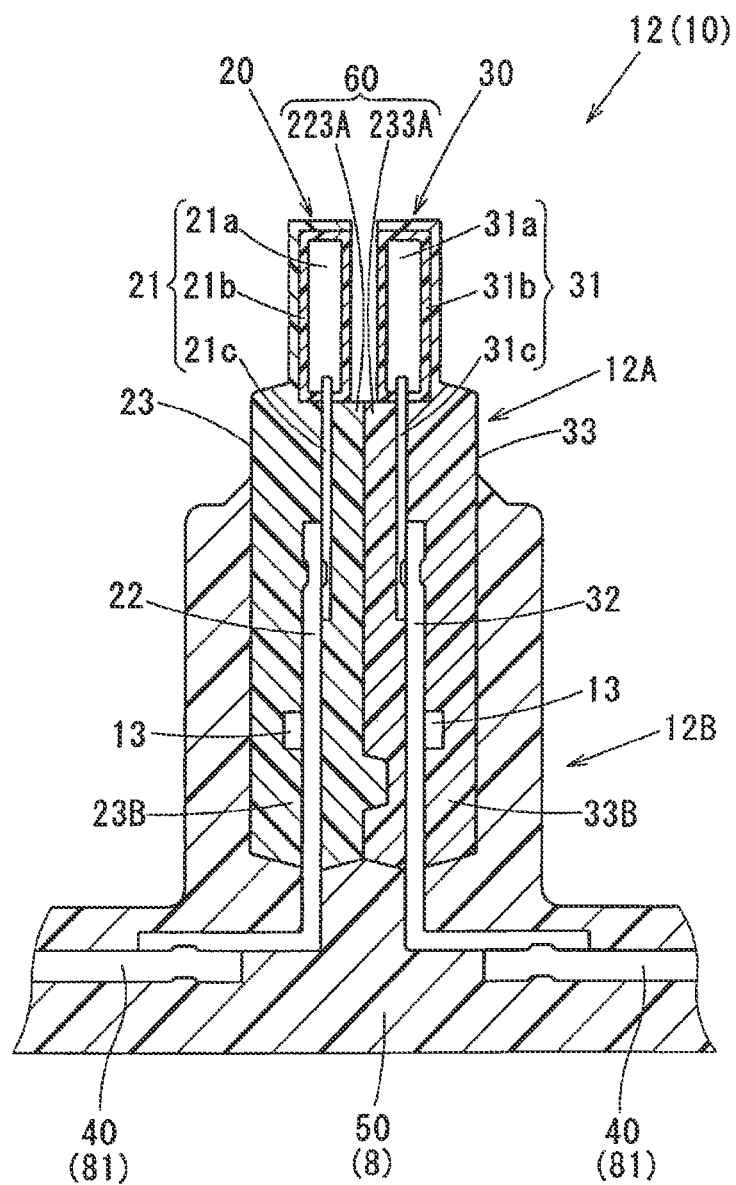
FIG. 7 is a cross-sectional view illustrating a stator of a rotation angle detecting device in a modification of the embodiment.

Alternatively, as shown in FIG. 7, the first stepped portion 223A is located in an area that is unable to overlap with a projection area defined by projecting the first magnetic sensor 21 to the second magnetic sensor 31. The end surface of the first magnetic sensor 21 from which the lead 21c is projected is aligned with the end surface of the first stepped portion 223A. The end surface of the second magnetic sensor 31 from which the lead 31c is projected is aligned with the end surface of the second stepped portion 233A.

Figure 8:
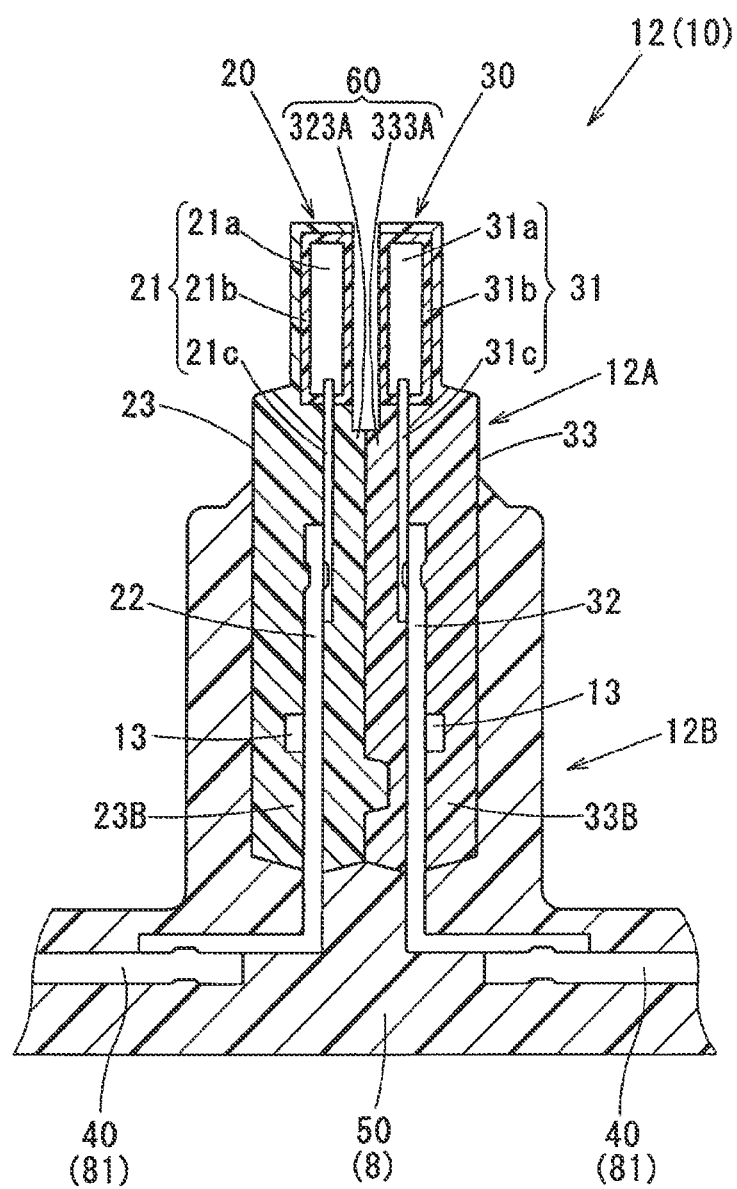
FIG. 8 is a cross-sectional view illustrating a stator of a rotation angle detecting device in a modification of the embodiment.

Moreover, as shown in FIG. 8, the end surface of the first stepped portion 323A is located between the terminal 40 and the end surface of the first magnetic sensor 21 from which the lead 21c is projected. The end surface of the second stepped portion 333A is located between the terminal 40 and the end surface of the second magnetic sensor 31 from which the lead 31c is projected.

In these cases, no mold resin is arranged between the first magnetic sensor 21 and the second magnetic sensor 31. Therefore, the remaining stress resulting from the third mold resin object 50 is difficult to act on the first magnetic sensor 21 and the second magnetic sensor 31.

The rotation angle detecting device 10 is described as an example of a position detecting device suitable for an electronic control throttle apparatus. The present disclosure is applicable to various position detecting devices such as a rotation angle sensor which detects the degree of rotation angle of a tumble control valve and the degree of rotation angle of an accelerator, and a stroke sensor which detects the amount of strokes of a clutch actuator.

Such changes and modifications are to be understood as being within the scope of the present disclosure as defined by the appended claims.

What is claimed is:

1. A position detecting device comprising:
a first sensor portion including
a first magnetic sensor,
a first wiring extending from the first magnetic sensor, and
a first mold resin object molded for the first magnetic sensor and the first wiring;
a second sensor portion including
a second magnetic sensor,
a second wiring extending from the second magnetic sensor, and
a second mold resin object molded for the second magnetic sensor and the second wiring;
a terminal connected to a part of the first wiring projected from the first mold resin object and connected to a part of the second wiring projected from the second mold resin object; and
a third mold resin object molded for the first sensor portion, the second sensor portion, and the terminal so as to cover the first wiring, the second wiring, and the terminal, wherein
the third mold resin object fixes the first sensor portion and the second sensor portion to oppose to each other, and
the first sensor portion and the second sensor portion have surfaces opposing to each other, and a protrusion part on the surfaces to provide a clearance between the first magnetic sensor and the second magnetic sensor; wherein
the first sensor portion has a first stepped portion on a surface of the first mold resin object adjacent to the second mold resin object,
the second sensor portion has a second stepped portion on a surface of the second mold resin object adjacent to the first mold resin object,
the protrusion part is defined by the first stepped portion and the second stepped portion in contact with each other,
the first magnetic sensor has a first magnetic detection element, a first sealing object, and a first lead,
the first stepped portion is in contact with at least an end part of the first sealing object adjacent to the first lead,
the first magnetic sensor has a first magnetic detection element, a first sealing object, and a first lead, and
the first stepped portion is located in an area that is unable to overlap with a projection area defined by projecting the first magnetic detection element to the second magnetic sensor.

2. The position detecting device according to claim 1, wherein
the first sensor portion and the second sensor portion are configured to have a same structure including an appearance.

3. The position detecting device according to claim 1, wherein
the first sensor portion further has a first projection part and a first recess portion on a surface of the first sensor portion in contact with the second sensor portion,
the second sensor portion further has a second projection part and a second recess portion on a surface of the second sensor portion in contact with the first sensor portion, and
the first sensor portion and the second sensor portion are positioned by the first projection part and the second recess portion fitted with each other and the second projection part and the first recess portion fitted with each other.

4. The position detecting device according to claim 1, wherein
the protrusion part is defined between the first mold resin object and the second mold resin object, and
the clearance is defined between the first magnetic sensor and the second magnetic sensor.

5. A position detecting device comprising:
a first sensor portion including
a first magnetic sensor,
a first wiring extending from the first magnetic sensor, and
a first mold resin object molded for the first magnetic sensor and the first wiring:
a second sensor portion including
a second magnetic sensor,
a second wiring extending from the second magnetic sensor, and
a second mold resin object molded for the second magnetic sensor and the second wiring;
a terminal connected to a part of the first wiring projected from the first mold resin object and connected to a part of the second wiring projected from the second mold resin object; and
a third mold resin object molded for the first sensor portion, the second sensor portion, and the terminal so as to cover the first wiring, the second wiring, and the terminal, wherein
the third mold resin object fixes the first sensor portion and the second sensor portion to oppose to each other, and
the first sensor portion and the second sensor portion have surfaces opposing to each other, and a protrusion part on the surfaces to provide a clearance between the first magnetic sensor and the second magnetic sensor, wherein
the protrusion part is constructed by a first stepped portion projected from the first mold resin object toward the second sensor portion and a second stepped portion projected from the second mold resin object toward the first sensor portion, and
the protrusion part has no clearance between the first stepped portion and the second stepped portion.

6. The position detecting device according to claim 5, wherein
the first sensor portion and the second sensor portion are configured to have a same structure including an appearance.

7. The position detecting device according to claim 5, wherein
the first sensor portion further has a first projection part and a first recess portion on a surface of the first sensor portion in contact with the second sensor portion,
the second sensor portion further has a second projection part and a second recess portion on a surface of the second sensor portion in contact with the first sensor portion, and
the first sensor portion and the second sensor portion are positioned by the first projection part and the second recess portion fitted with each other and the second projection part and the first recess portion fitted with each other.

8. A position detecting device comprising:
a first sensor portion including
a first magnetic sensor,
a first wiring extending from the first magnetic sensor, and
a first mold resin object molded for the first magnetic sensor and the first wiring;
a second sensor portion including
a second magnetic sensor,
a second wiring extending from the second magnetic sensor, and
a second mold resin object molded for the second magnetic sensor and the second wiring;
a terminal connected to a pan of the first wiring projected from the first mold resin object and connected to a part of the second wiring projected from the second mold resin object; and
a third mold resin object molded for the first sensor portion, the second sensor portion, and the terminal so as to cover the first wiring, the second wiring, and the terminal, wherein
the third mold resin object fixes the first sensor portion and the second sensor portion to oppose to each other, and
the first sensor portion and the second sensor portion have surfaces opposing to each other, and a protrusion part on the surfaces to provide a clearance between the first magnetic sensor and the second magnetic sensor, wherein
the first mold resin object has a first stepped portion that forms a first step height relative to a surface of the first magnetic sensor, on a surface of the first mold resin object adjacent to the second mold resin object,
the second mold resin object has a second stepped portion that forms a second step height relative to a surface of the second magnetic sensor, on a surface of the second mold resin object adjacent to the first mold resin object, and
a sum of the first step height and the second step height is equal to a dimension of the clearance between the first magnetic sensor and the second magnetic sensor.

9. The position detecting device according to claim 8, wherein
the first sensor portion and the second sensor portion are configured to have a same structure including an appearance.

10. The position detecting device according to claim 8, wherein
the first sensor portion further has a first projection part and a first recess portion on a surface of the first sensor portion in contact with the second sensor portion,
the second sensor portion further has a second projection part and a second recess portion on a surface of the second sensor portion in contact with the first sensor portion, and
the first sensor portion and the second sensor portion are positioned by the first projection part and the second recess portion fitted with each other and the second projection part and the first recess portion fitted with each other.

11. A position detecting device comprising:
a first sensor portion including
a first magnetic sensor,
a first wiring extending from the first magnetic sensor, and
a first mold resin object molded for the first magnetic sensor and the first wiring;
a second sensor portion including
a second magnetic sensor,
a second wiring extending from the second magnetic sensor, and
a second mold resin object molded for the second magnetic sensor and the second wiring;
a terminal connected to a part of the first wiring projected from the first mold resin object and connected to a part of the second wiring projected from the second mold resin object; and
a third mold resin object molded for the first sensor portion, the second sensor portion, and the terminal so as to cover the first wiring, the second wiring, and the terminal, wherein
the third mold resin object fixes the first sensor portion and the second sensor portion to oppose to each other, and
the first sensor portion and the second sensor portion have surfaces opposing to each other, and a protrusion part on the surfaces to provide a clearance between the first magnetic sensor and the second magnetic sensor, wherein
the first sensor portion is covered by the first mold resin object on a side of the first sensor portion opposite the surfaces opposing to each other;
the second sensor portion is covered by the second mold resin object on a side of the second sensor portion opposite the surfaces opposing to each other; and
at least part of the surfaces opposing to each other are uncovered by the first mold resin object and the second mold resin object.

12. The position detecting device according to claim 11, wherein
the first sensor portion and the second sensor portion are configured to have a same structure including an appearance.

13. The position detecting device according to claim 11, wherein
the first sensor portion further has a first stepped portion on a surface of the first mold resin object adjacent to the second mold resin object,
the second sensor portion further has a second stepped portion on a surface of the second mold resin object adjacent to the first mold resin object, and
the protrusion part is defined by the first stepped portion and the second stepped portion in contact with each other.

14. The position detecting device according to claim 11, wherein
the first sensor portion further has a first projection part and a first recess portion on a surface of the first sensor portion in contact with the second sensor portion,
the second sensor portion further has a second projection part and a second recess portion on a surface of the second sensor portion in contact with the first sensor portion, and
the first sensor portion and the second sensor portion are positioned by the first projection part and the second recess portion fitted with each other and the second projection part and the first recess portion fitted with each other.

15. The position detecting device according to claim 11, wherein
the protrusion part is defined between the first mold resin object and the second mold resin object, and
the clearance is defined between the first magnetic sensor and the second magnetic sensor.

* * * * *